United States Patent [19]

Bloomfield

[11] 3,894,281
[45] July 8, 1975

[54] BATTERY AND GENERATOR VEHICLE LIGHTING SYSTEM

[75] Inventor: Alan M. Bloomfield, Des Plaines, Ill.

[73] Assignee: Sears, Roebuck and Co., Chicago, Ill.

[22] Filed: Jan. 21, 1974

[21] Appl. No.: 434,997

[52] U.S. Cl. .................. 322/1; 240/7.6; 315/78; 315/88
[51] Int. Cl. .............................. B62j 5/00
[58] Field of Search .......... 322/1, 32, 29; 240/7.55, 240/7.6; 315/76–79, 87, 88, 89, 129; 307/9, 16, 28, 38, 39, 66

[56] References Cited
UNITED STATES PATENTS

| | | | |
|---|---|---|---|
| 2,299,762 | 10/1942 | McDermott | 322/1 X |
| 3,171,058 | 2/1965 | Ono | 315/78 |
| 3,189,788 | 6/1965 | Cady | 315/129 |
| 3,792,307 | 2/1974 | Baker | 315/78 X |
| 3,819,980 | 6/1974 | Mullersman | 307/66 X |

Primary Examiner—J. D. Miller
Assistant Examiner—Robert J. Hickey
Attorney, Agent, or Firm—Arnstein, Gluck, Weitzenfeld & Minow

[57] ABSTRACT

A vehicle lighting system utilizes both generating means and battery means for providing substantially constant lighting whether the vehicle is moving or halted. The system in addition to generating means, battery means and first and second light means, includes potential dividing means and solid state circuit means for electrically interconnecting these means. The system is operable with a vehicle member rotating at a velocity related to the speed of the vehicle. With the generating means placed in an operating mode with respect to the vehicle member, the first light means is energized upon the member rotating at a velocity above a predetermined velocity, whereas the second light means is energized by the battery means upon the vehicle member rotating at a velocity lower than the predetermined velocity. Additional light means can be included in the system to provide lighting of or at additional portions of the vehicle either with or without the substantially constant lighting feature.

9 Claims, 4 Drawing Figures

BATTERY AND GENERATOR VEHICLE LIGHTING SYSTEM

BACKGROUND OF THE INVENTION

The present invention relates to a vehicle lighting system which provides for substantially constant lighting irrespective of the velocity of the vehicle. "Constant lighting" as used herein refers to the presence of illumination and not necessarily to the amount of illumination provided by the system.

Vehicle lighting systems, particularly for bicycles, operable from batteries or a small generator operable with the rim or tire of a bicycle are known in the art. Generally, the battery operated lights provide constant, relatively uniform illumination dependent upon the useful life of the batteries. Most commonly, flashlight or "D" size batteries are utilized for bicycle lights and these have a relatively short life which necessitates frequent changing of the batteries. Higher capacity batteries have been utilized to some extent, although such batteries add considerable weight to the bicycle which is disadvantageous, particularly with the popular, modern light-weight bicycles. As an alternative, lighting systems which operate from small generators have been used which free the system from dependence upon batteries. However, these lighting systems operate only when the vehicle is moving, and usually only when moving at a substantial velocity. When a bicycle having a generator system comes to a complete stop or is temporarily halted, the system fails and the lights are not energized. These blackouts, have been found to be detrimental to safety and require the operator to provide additional means for lighting the vehicle or providing a warning to others of the position of the vehicle.

Although in a few instances bicycle lighting systems have been proposed which utilize both a generator and batteries for lighting bicycle lights, these systems have not been generally acceptable due to the cumbersome and complex switching arrangements required in such systems. For example, one such system utilized a speed responsive governor switch which required numerous moving parts and contacts to effect the switching between the battery power supply and the generator power supply. In another system, designed for trucks and automobiles, electrical relays are utilized to open and close circuits between battery operated lamps and generator operated lamps. Governor operated switches and relay operated switches have been found to frequently fail due to the mechanical wear of moving parts and relay levers and are frequently subject to corrosion of the electrical contacts, particularly where the vehicle, particularly bicycles, are exposed to inclement weather.

BRIEF SUMMARY OF THE INVENTION

Therefore, one object of the present invention is the provision of a vehicle lighting system, particularly adapted for use with bicycles, which automatically, selectively operates light means using a battery operated supply and a velocity responsive generator supply without the use of moving parts or relays in the supply selection apparatus.

Another object of this invention is the provision of a vehicle lighting system wherein one light means is continually connected to a speed responsive generator power supply while another light means is automatically energizable from battery means upon the vehicle reducing speed below a predetermined minimum speed.

Still another object of this invention is the provision of a vehicle lighting system which utilizes a solid state circuit being free of moving parts for interconnecting light means with a power supply for energizing the light means upon a vehicle member rotating at a velocity lower than a predetermined velocity, but causing the light means to be unenergized by the power supply upon the vehicle member rotating at a velocity above the predetermined velocity.

Further objects and advantages of this invention will become apparent from the following description when the same is considered in connection with the accompanying drawings.

In accordance with the present invention there is provided a velocity responsive battery and generator lighting system for a vehicle having a member rotatable at a velocity related to the speed of the vehicle. The system includes generating means mounted on the vehicle adjacent the rotatable member for generating electricity, first light means mounted on the vehicle and electrically connected with the generating means, potential dividing means operable with the generating means, second light means mounted on the vehicle, battery means and solid state circuit means for interconnecting the second light means, the battery means and the potential dividing means. The generating means is selectively switchable between an operating mode and an inoperable mode with respect to the rotatable member of the vehicle. The generating means is further operable in the operating mode to generate a first predetermined potential in response to the rotatable vehicle member rotating at a velocity above a predetermined velocity. The first light means is energized in response to the generating means generating the first predetermined potential. The potential dividing means is operable with the generating means for generating a potential lower than the first predetermined potential and proportional to the rotational velocity of the rotatable member. The second light means of the system is operable to be energized at a second predetermined potential which is producible by the battery means also mounted on the vehicle. The solid state circuit means is free of moving parts and controls the second light means whereby the second light means is unenergized upon the rotatable member rotating at a velocity above the predetermined velocity and the second light means is energized by the battery means upon the rotatable member rotating at a velocity lower than the predetermined velocity.

The lighting system of the present invention is particularly adapted for use on light-weight, non-motorized vehicles, particularly bicycles. The lighting system is especially useful to provide a headlight or a taillight for a bicycle where constant lighting is desired for safety. The system dependably eliminates the danger of having no lighting available when the vehicle comes to a stop light or intersection and the motion of the vehicle ceases. The system is particularly dependable since the control circuit does not include any moving parts or relays, but utilizes electronic solid state switching to selectively energize a battery powered lamp when the speed of the vehicle is insufficient to provide sufficient power to maintain the generator powered lamp at an adequate illumination level. As the system does not utilize the battery powered lamp while the vehicle is in sustained motion, but only utilizes battery power at low speeds or when stopped, the useful life of the battery is greatly extended as compared to common battery operated lighting systems. In addition, the solid state circuit means utilized in the system of the present invention substantially prevents accidental charging of the battery means. Thus, the system of the present invention provides a safe, dependable vehicle lighting system which is effective to provide illumination both when the vehicle is moving at a sustained velocity and when it is slowing or standing still without drawing power from the battery during the former condition.

BRIEF DESCRIPTION OF PREFERRED EMBODIMENTS

Figure 1:
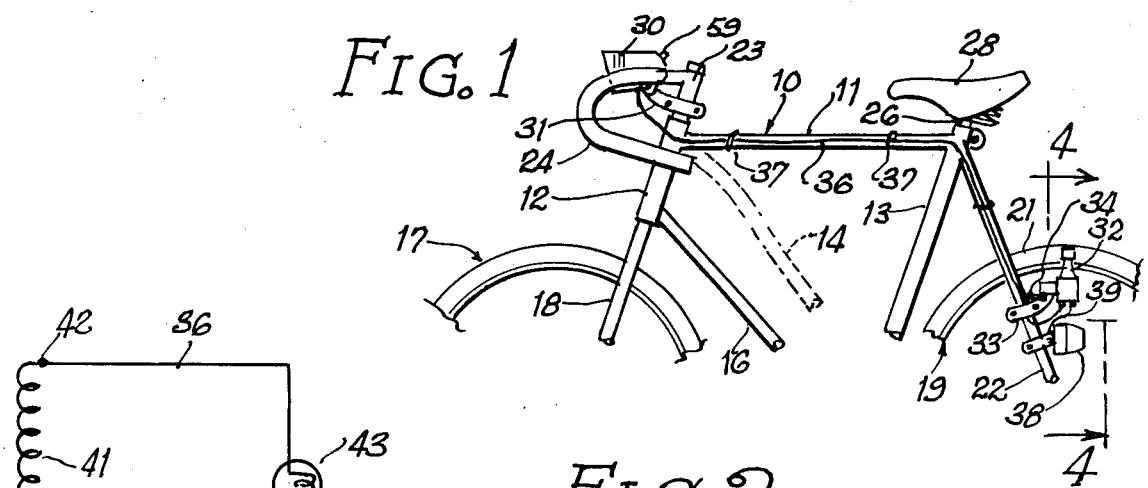
FIG. 1 is a fragmentary side view of an embodiment of the present invention mounted on a bicycle frame.

In the particular construction shown in FIG. 1 of the drawings, the numeral 10 indicates, generally a bicycle frame typical of bicycle frames on which the lighting system of the present invention is especially adapted to be mounted. Frame 10 includes a horizontal member 11 which serves to connect a steering post 12 with a seat post member 13. As is well known, horizontal member 11 may be positioned to extend downwardly and rearwardly as shown in position 14 represented by broken lines. Bicycle frame 10 also commonly has another member 16 which further supports steering post 12 in relation to seat post member 13 at the lower portion thereof. Frame 10 supports a front wheel and tire assembly 17 journalled between a front fork 18 extending downwardly from steering post 12, and a rear wheel and tire assembly 19, including a rear tire 21, journalled between a pair of struts 22 which extend downwardly and rearwardly from seat post member 13. Extending upwardly from steering post 12 is a handlebar stem 23 with handlebars 24 fastened thereto and journalled in steering post 12 to rotate with and control the rotation of fork 18. The remaining members of frame 10 illustrated in FIG. 1 are a seat post 26 extending upwardly from seat post member 13 and a saddle seat 28 mounted on stem 26.

Figure 4:
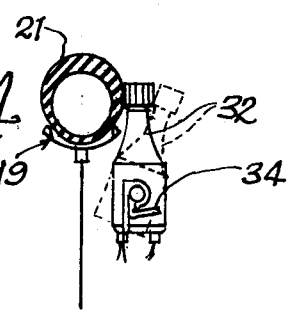
FIG. 4 is a fragmentary cross-sectional view, on an enlarged scale, taken substantially on line 4—4 of FIG. 1.

As shown in FIG. 1, the system of the present invention includes a headlight housing 30 secured to a bracket 31 which in turn is mounted on handlebar stem 23, and a generator 32 for generating electricity mounted on a bracket 33 which in turn is mounted on one of the pair of struts 22. Generator 32 includes a mechanical position switch 34 which permits generator 32 to be selectively switchable between an operating mode with respect to tire 21, as best shown in FIG. 4 and an inoperable mode with respect to tire 21 as shown by the broken line position of generator 32 in FIG. 4. The system of the present invention further includes wires 36 which extend between headlight housing 30 and generator 32. Wires 36 may be threaded through the members of frame 10, or may be supported on frame 10 by suitable fasteners, such as clips 37. The system of the present invention can include additional lights, one of which is shown in the form of taillight housing 38 which is clamped to strut 22. Wire 39 interconnects the lamp (not shown) with generator 32.

Figure 2:
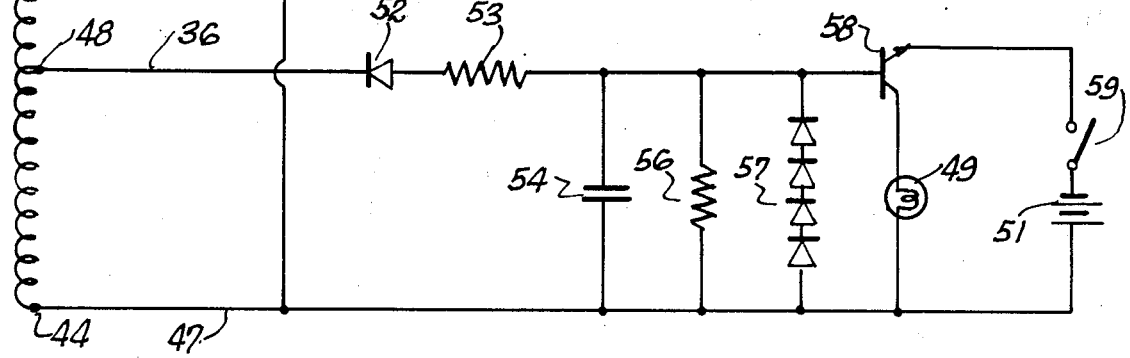
FIG. 2 is a schematic circuit diagram illustrating an embodiment of the present invention.

In its simplest form, the system of the present invention includes generating means, such as generator 32, first and second light means, potential dividing means, battery means and solid state circuit means for interconnecting the second light means, the battery means and the potential dividing means, as more particularly shown in FIG. 2. FIG. 2 will be described in conjunction with FIG. 1 as in the preferred embodiment of the present invention it is contemplated that all of the components shown in FIG. 2, except for coil 41, the terminals thereof and wires leading therefrom, will be included and mounted within headlight housing 30. Coil 41 and its terminals are contemplated as being components of generator 32 as hereinafter described. Referring to FIG. 2, coil 41, which preferably is the field coil of generator 32 includes an end terminal 42 which is connected to a first lamp 43, representing the first light means, by one of wires 36. Lamp 43 is also connected to the other end terminal 44 of coil 41 by means of connector 46 and a connector 47 which preferably is a portion of frame 10 when the latter is of conductive metal construction. Lamp 43 is permanently or continually connected to the end terminals of coil 41, whereby with generator 32 being placed in the operating mode with respect to tire 21, as shown in FIG. 4, and with tire 21 rotating at a velocity above a predetermined velocity, for example approximately 4 miles per hour, a first predetermined potential, for example 12 volts, is generated across coil 41 which causes lamp 43 to be energized in response to the first predetermined potential being placed thereacross. When tire 21 is rotating, at a velocity less than approximately 4 miles per hour or is halted, a potential, if any, lower than the first predetermined potential is generated across coil 41 which is insufficient to adequately energize lamp 43 to provide sufficient headlight illumination.

The system of the present invention further includes potential dividing means operable with generating means, such as generator 32, for generating a potential lower than the first predetermined potential and proportional to the rotational velocity of the rotating member, such as tire 21. As shown in FIG. 2, the potential dividing means comprises a center tap 48 of coil 41 in conjunction with end terminal 44 of the coil. Tap 48 and terminal 44 comprises potential dividing means wherein a potential is generated thereacross which is lower than the first predetermined potential and is proportional to the rotational velocity of tire 21 whenever generator 32 is placed in an operating mode with respect to the tire. Terminal 44 and tap 48 constitute first and second terminal connections, respectively, of circuit means which interconnect a second lamp 49 and a battery 51 with the thus constituted potential dividing means for controlling lamp 49 whereby the lamp is unenergized upon tire 21 rotating at a velocity above the predetermined velocity, lamp 49 being energized by battery 51 upon tire 21 rotating at a velocity lower than the predetermined velocity.

As shown in FIG. 2, the solid state circuit means of the present invention is free of moving parts and in addition to the first and second terminal connections to terminal 44 and tap 48, respectively, includes a solid state rectifier 52, a first resistance 53 and a capacitance 54 connected in series between the terminal connections. A second resistance 56 is connected in parallel with capacitance 54 to form a circuit in which the output of the generator in conjunction with the potential dividing means is half wave rectified by rectifier 52 and charges capacitance 54. The circuit means further includes a plurality of solid state diodes 57 which are connected in series with each other and together in parallel with resistance 56 and capacitance 54. A solid state transistor 58 is connected between the common connection of resistances 53 and 56, capacitance 54 and the plurality of diodes 57, and between lamp 49 and battery 51 which in turn have a common connection to each other and to the other parallel connection of capacitance 54, resistance 56 and the plurality of diodes 57. More particularly, transistor 58 is connected with its base connected to the connection common to resistances 53 and 56, capacitance 54 and the plurality of diodes 57, its emitter connected to battery 51 and its collector connected to lamp 49. The circuit thus described is operable to control the energization of lamp 49 in accordance with the potential generated between the first and second terminal connections, that is terminal 44 and tap 48, in response to the velocity of rotation of tire 21 or other rotatable member of the vehicle.

Specifically, the circuit illustrated in FIG. 2 is effective to control the energization of lamp 49 by transistor 58 and the lamp being unenergized upon tire 21 rotating at a velocity above the predetermined velocity, and by transistor 58 and lamp 49 being energized upon tire 21 rotating at a velocity below the predetermined velocity. The circuit operates to control lamp 49 in the following manner: Capacitance 54 is charged to a direct current potential which is limited by the forward potential drop across the plurality of diodes 57 which parallel the capacitance. The base-to-emitter bias voltage on transistor 58 is the potential output of battery 51 minus the potential present across plurality of diodes 57. Upon tire 21 rotating at a velocity faster than the predetermined velocity, the base-to-emitter voltage is insufficient to cause transistor 58 to conduct and therefore, lamp 49 is not energized. Upon tire 21 rotating at a velocity lower than the predetermined velocity, the potential generated across terminal 44 and tap 48 is reduced proportionately until the potential across capacitance 54 is insufficient to maintain the plurality of diodes 57 in a state of conduction. When the plurality of diodes 57 is in a state of non-conduction, the base-to-emitter potential of transistor 58 is sufficient to cause transistor 58 to conduct, which biases the transistor to connect lamp 49 with battery 51 in series, and hence lamp 49 is energized by battery 51. In this manner, lamp 49 remains automatically unenergized when the velocity of tire 21, and hence the output of coil 41, is sufficient to maintain the energization of lamp 43 at its rated potential without draining battery 51, and permits lamp 49 to be energized by battery 51 whenever tire 21 is rotating at a velocity below the predetermined velocity, and hence generator 32 is not generating a sufficient potential to maintain the energization of lamp 43 at its rated potential.

As previously noted, in the preferred embodiment of the present invention all of the components except generator 32, its terminals and the connectors therefrom are preferably mounted and contained within headlight housing 30. It is contemplated that both of lamps 43 and 49 will be placed within a suitable reflector in the housing to illuminate the area forwardly of the vehicle. By mounting housing 30 to the handlebar stem, the handlebars or the fender or fork of a bicycle the housing will be turned with the handlebars of the bicycle to illuminate the forward steered course of the vehicle. If illumination of the steered course is not desired, the housing can be mounted to the steering post or other non-rotatable member of frame 10. In addition, a switch 59 can be included within the circuit, preferably between battery 51 and the emitter of transistor 58 to disconnect battery 51 from the circuit when the system is not in use or when it is desired to utilize a generator-only mode of operation. Conveniently, switch 59 can be a toggle or slide switch mounted in housing 30 with its actuator accessible to the operator of the vehicle.

Figure 3:
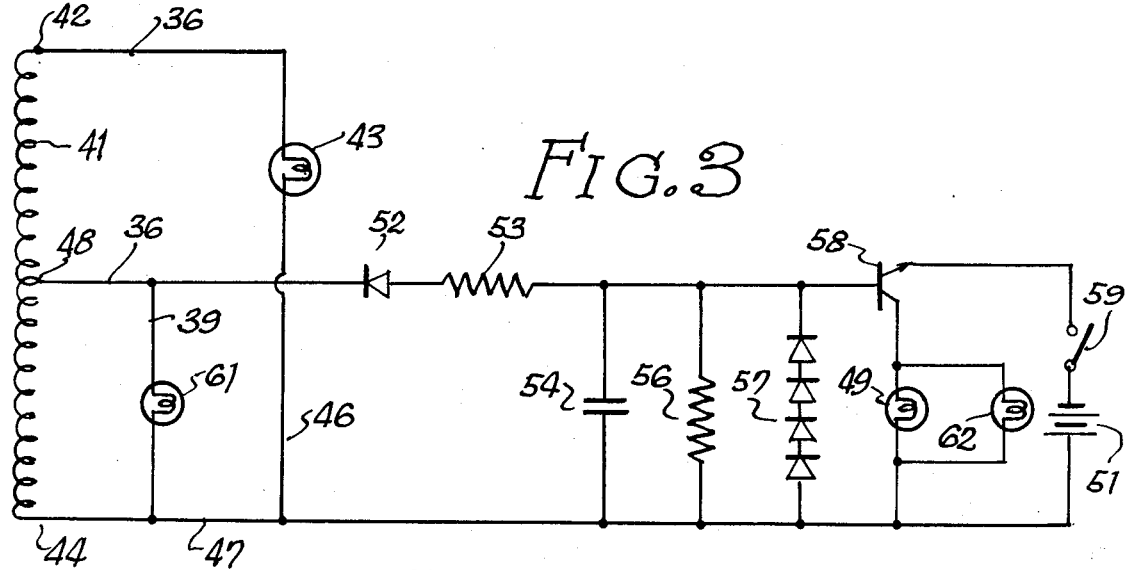
FIG. 3 is a schematic circuit diagram illustrating another embodiment of the present invention.

In another embodiment of the present invention, one or more additional lamps are included within the lighting system to provide for rearward illumination, for example a taillight, for the vehicle. In one form of the present invention, the potential dividing means comprising center tap 48 and end terminal 44 of coil 41 is operable with generator 32 being placed in its operating mode with respect to tire 21 for generating a third predetermined potential, conveniently 6 volts, in response to tire 21 rotating at a velocity above the predetermined velocity. Lamp 61 mounted on frame 10, preferably as a taillight within housing 38, is connected to tap 48 by means of wire 39 and is also connected to terminal 44 by means of connector 47 heretofore described. In this manner, lamp 61 is energized by the third predetermined potential in response to the tire 21 rotating at a velocity above the predetermined velocity. As the velocity of tire 21 slows to a velocity below the predetermined velocity, the potential generated between tap 48 and terminal 44 decreases causing a corresponding decrease in the illumination output of lamp 61. When the velocity of tire 21 is zero or nearly zero, lamp 61 is extinguished. The alternate embodiment of the present invention further contemplates still another lamp 62 mounted within or adjacent taillight housing 38 and wired in parallel to lamp 49 as shown in FIG. 3. As the lamp 62 will be operated in conjunction with lamp 49, rearward, taillight illumination will be safely provided by the system of the present invention even though the vehicle has slowed or is stopped, and hence the generation of potential by generator 32 has diminished, and lamp 61 is no longer providing adequate illumination. In the embodiment of the present invention thus described, illumination from the vehicle in both the forward and the rearward directions is continually maintained irrespective of the velocity of the vehicle and with a minimum drain on the battery power supply of the system.

It has been found that a practical lighting system for a bicycle is attained by utilizing the circuit illustrated in FIG. 3, with the exception of lamp 62 which was omitted, by providing electronic components having the following ratings:

| Reference Numeral | Description | Value |
|---|---|---|
| 43 | Lamp | 12 volts, 6 Watts |
| 49 | Lamp | 2.5 Volts |
| 51 | Battery (2 in series) | 1.5 Volt "C" Batteries |
| 53 | First Resistance | 39 Ohms |
| 54 | Capacitance | 220 Microfarads |
| 56 | Second Resistance | 560 Ohms |

-Continued

| Reference Numeral | Description | Value |
|---|---|---|
| 61 | Lamp | 6 Volts, 0.5 Watts |
| 41 | Generator | 12 Volts (6 Volts at Center Tap) |

Operation of the lighting system as described above provided excellent results with continued illumination over a wide range of vehicle speeds including a stopped condition. With the predetermined velocity set at between 4½ and 5½ miles per hour sufficient headlight illumination was provided to illuminate the path ahead of the bicycle under the darkest conditions, while sufficient illumination for safety was provided by the headlight while the bicycle slowed to a stop and remained in a stopped condition.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A velocity responsive battery and generator lighting system for a vehicle having a member rotatable at a velocity related to the speed of the vehicle, comprising:
   a. generating means for generating electricity mounted on said vehicle adjacent said member and selectively switchable between an operating mode and an inoperable mode with respect to said member, said generating means being operable in said operating mode to generate a first predetermined potential in response to said member rotating at a velocity above a predetermined velocity,
   b. first light means mounted on said vehicle and electrically connected with said generating means, said first light means being energized in response to said generating means generating said first predetermined potential,
   c. potential dividing means operable with said generating means for generating a potential lower than said first predetermined potential and proportional to the rotational velocity of said member,
   d. second light means mounted on said vehicle operable to be energized at a second predetermined potential,
   e. battery means for protruding said second predetermined potential mounted on said vehicle, and
   f. solid state circuit means being free of moving parts for interconnecting said second light means, said battery means and said potential dividing means and including solid state switching means for controlling said second light means between unenergized and energized conditions and means responsive to the potential generated by said generating means with said potential dividing means for controlling said switching means, whereby said second light means is unenergized upon said member rotating at a velocity above said predetermined velocity and said second light means is energized by said battery means upon said member rotating at a velocity lower than said predetermined velocity.

2. The system of claim 1, wherein said potential dividing means is operable with said generating means in its operating mode for generating a third predetermined potential in response to said member rotating a velocity above said predetermined velocity.

3. The system of claim 2, having third light means mounted on said vehicle and electrically connected with said potential dividing means and said generating means, said third light means being energized in response to said generating means in its operating mode generating said third predetermined potential with said potential dividing means.

4. The system of claim 3, having fourth light means mounted on said vehicle and connected in parallel with said second light means and being operable to be energized at said second predetermined potential, whereby said fourth light means is unenergized upon said member rotating at a velocity above said predetermined velocity and said fourth light means is energized by said battery means upon said member rotating at a velocity lower than said predetermined velocity.

5. The system of claim 4, wherein said first and second light means are headlight means and said third and fourth light means are taillight means.

6. The system of claim 1 wherein said circuit means comprises a first terminal connection to a terminal of said generating means in electrical connection with said first light means, said first terminal connection constituting one terminal of said potential dividing means; a second terminal connection to another terminal of said potential dividing means; solid state rectifier means, a first resistance and a capacitance connected in series between said first and second terminal connections; a second resistance connected in parallel with said capacitance; a plurality of solid state diodes connected in series with each other and together in parallel with said second resistance; and a solid state transistor connected between said plurality of diodes, said second light means and said battery means; said circuit means being operable to control the energization of the second light means in accordance with the potential generated between said first and second terminal connections in response to the belocity of rotation of the said rotating member.

7. The system of claim 6, wherein said solid state transistor has its base connected to said plurality of solid state diodes, its emitter connected to said battery means, and its collector connected to said second light means, whereby said circuit means controls the energization of said second light means by said transistor and the second light means being unenergized upon said member rotating at a velocity above said predetermined velocity and by said transistor and the second light means being energized upon said member rotating at a velocity below said predetermined velocity.

8. The system of claim 6, wherein said potential dividing means comprises a center tap and said terminal of said generating means, and said center tap comprises said second terminal connection.

9. The system of claim 8, having third light means connected with said first and second terminal connections and being energized by the potential generated therebetween upon said member rotating at a velocity above said predetermined velocity.

* * * * *